(12) United States Patent
Lefler et al.

(10) Patent No.: US 6,944,343 B2
(45) Date of Patent: Sep. 13, 2005

(54) IMAGE ANALYZING METHOD FOR DETECTING SIGNIFICANT CHANGES IN A TIME SEQUENCE OF IMAGES

(75) Inventors: Kenneth A. Lefler, Silver Spring, MD (US); Wayne L. Kilmer, Sartell, MN (US); Yi Zhang, Fremont, CA (US)

(73) Assignee: ABB Inc., Norwalk, CT (US)

( * ) Notice: Subject to any disclaimer, the term of this patent is extended or adjusted under 35 U.S.C. 154(b) by 711 days.

(21) Appl. No.: 09/871,182

(22) Filed: May 31, 2001

(65) Prior Publication Data

US 2003/0016874 A1 Jan. 23, 2003

(51) Int. Cl.$^7$ .................................................. G06K 9/62
(52) U.S. Cl. ........................ 382/228; 382/141; 707/6; 348/86; 700/110
(58) Field of Search ............................ 382/228, 141, 382/142, 143, 144, 145, 146, 147, 148, 149, 150, 151, 152, 224; 700/95, 109, 110, 143, 144, 150, 204; 348/86, 125, 131, 132; 707/1, 6

(56) References Cited

U.S. PATENT DOCUMENTS 5,016,173 A * 5/1991 Kenet et al. ................. 382/128
5,627,907 A * 5/1997 Gur et al. .................... 382/132
5,768,412 A * 6/1998 Mitsuyama et al. ......... 382/173
6,577,757 B1 * 6/2003 DeYong et al. ............. 382/149

\* cited by examiner

Primary Examiner—Samir Ahmed
Assistant Examiner—Anand Bhatnagar
(74) Attorney, Agent, or Firm—Michael M. Rickin, Esq.

(57) ABSTRACT

An image analysis method designed to identify images in a sequence of images that are statistically different in a pre-selected region of interest. The method is suitable when there is no a priori knowledge of the nature of the interesting images. A reference image is used to identify specific regions of the image that may contain interesting changes (Detect Zone), that will not have interesting changes, but can be used to assess image quality (Veto zone), and an unanalyzed region (Ignore zone). To improve the spatial sensitivity, the Detect and Veto zones can be divided into specific cells. The analysis may also be performed on compressed data and another method automatically classifies a cell as either in the Detect zone or Ignore zone. The sensitivity can be further improved by removing periodic feature variation prior to the statistics calculation.

23 Claims, 7 Drawing Sheets

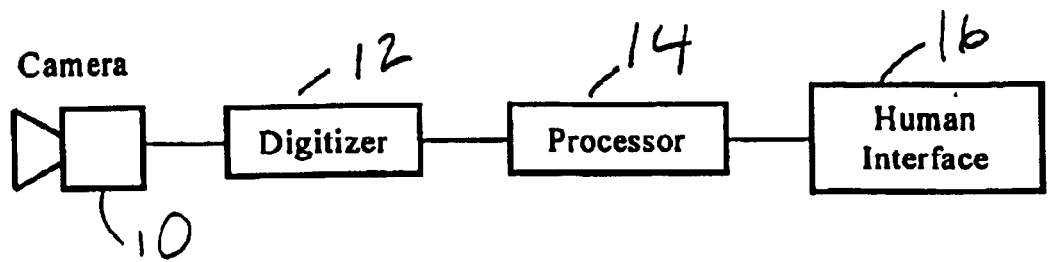
Figure 1: System Hardware Components
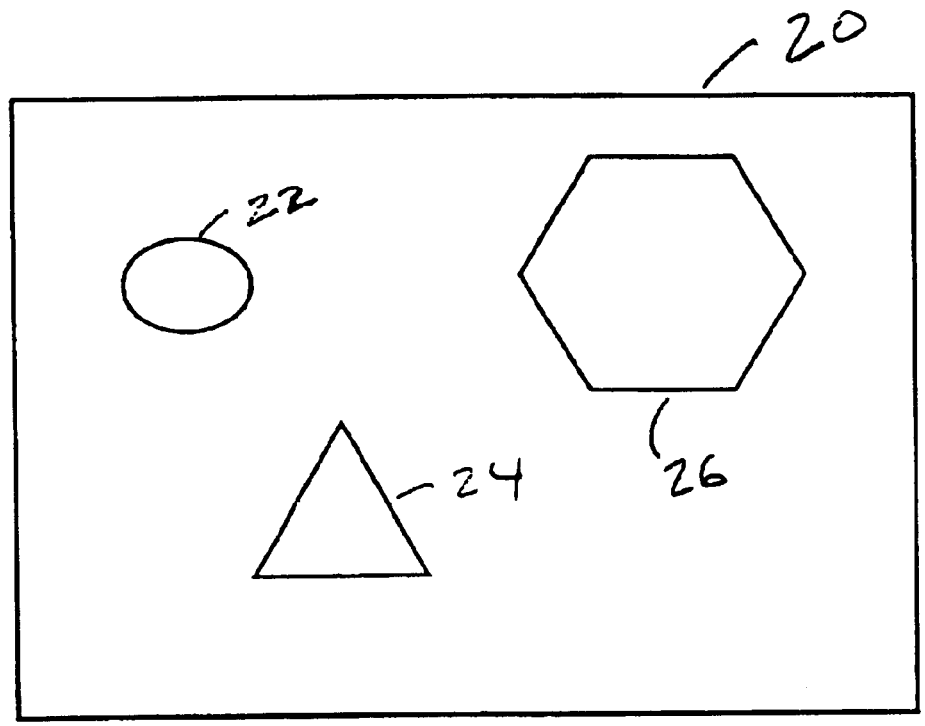
Figure 2: Schematic Image Prior to Cell Assignment

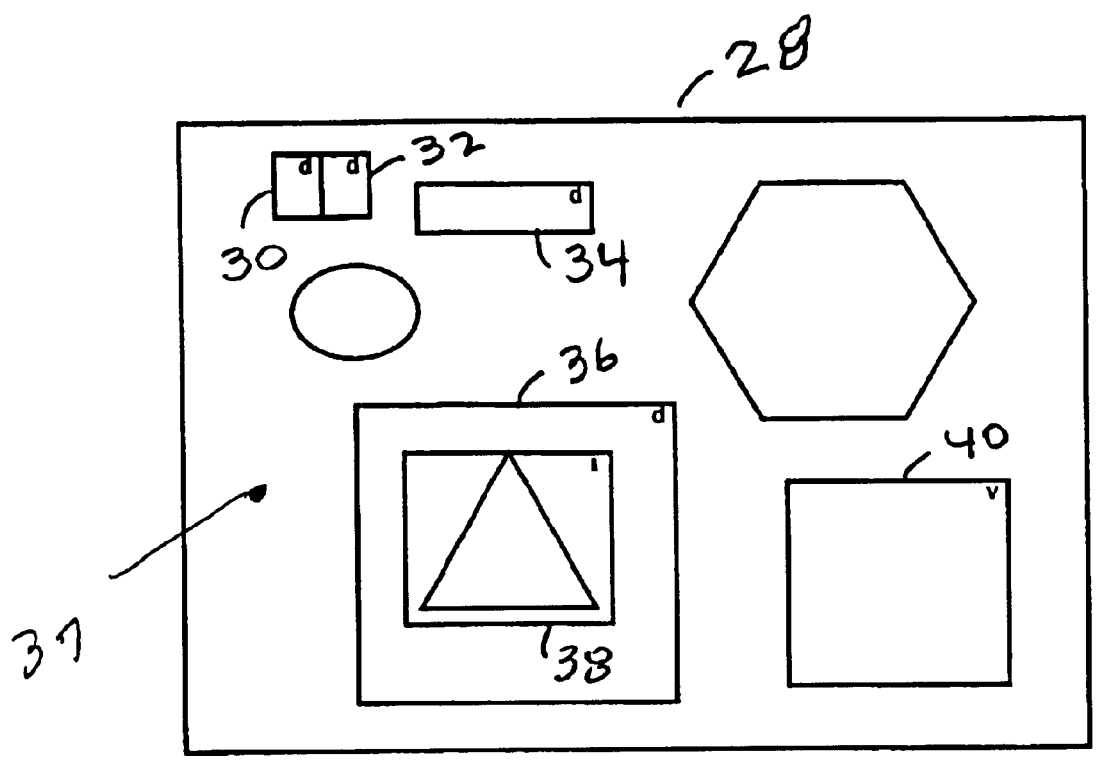
Figure 3: Schematic Image With Cell Assignment

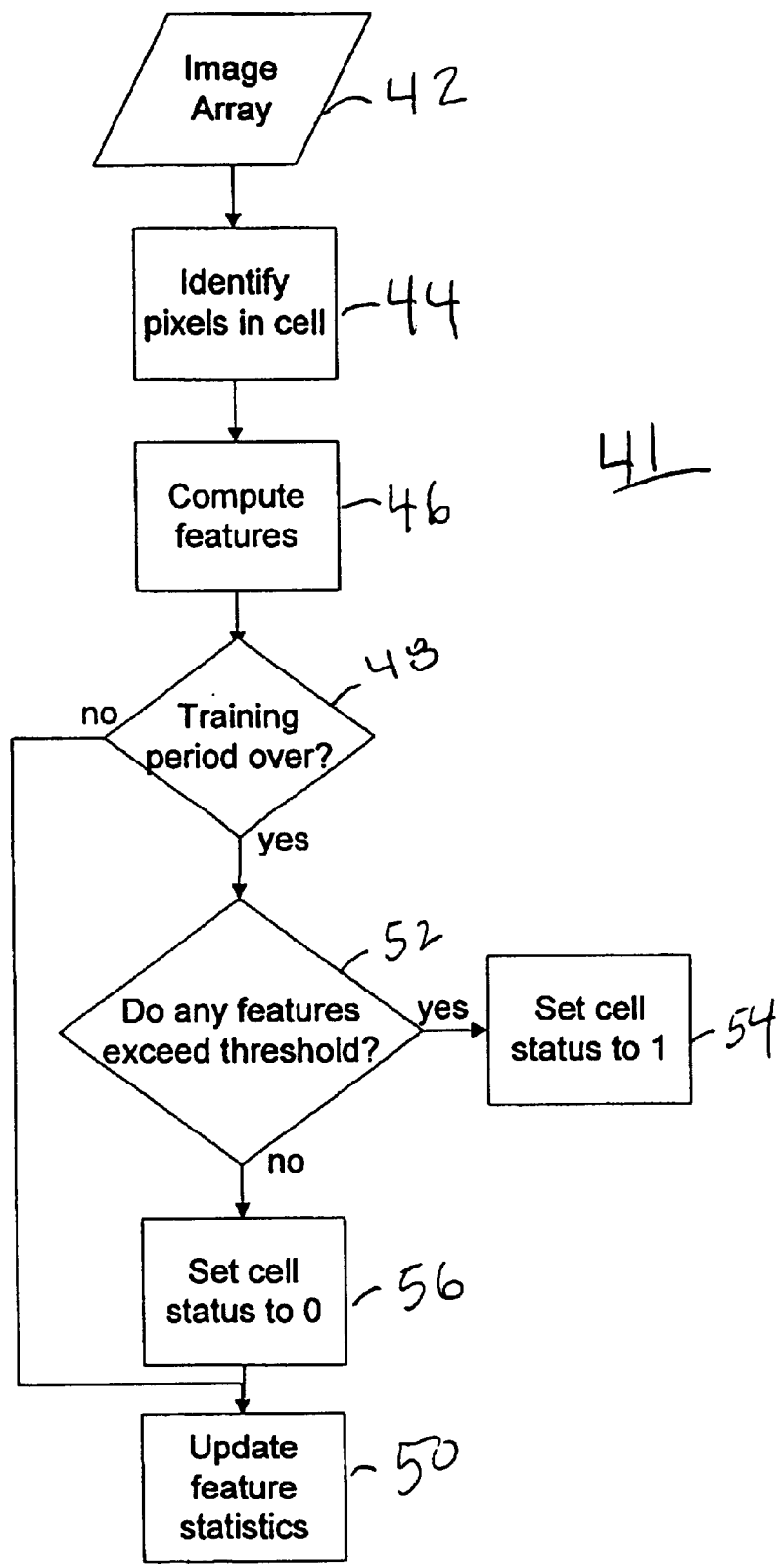
Figure 4: Cell Detection Logic

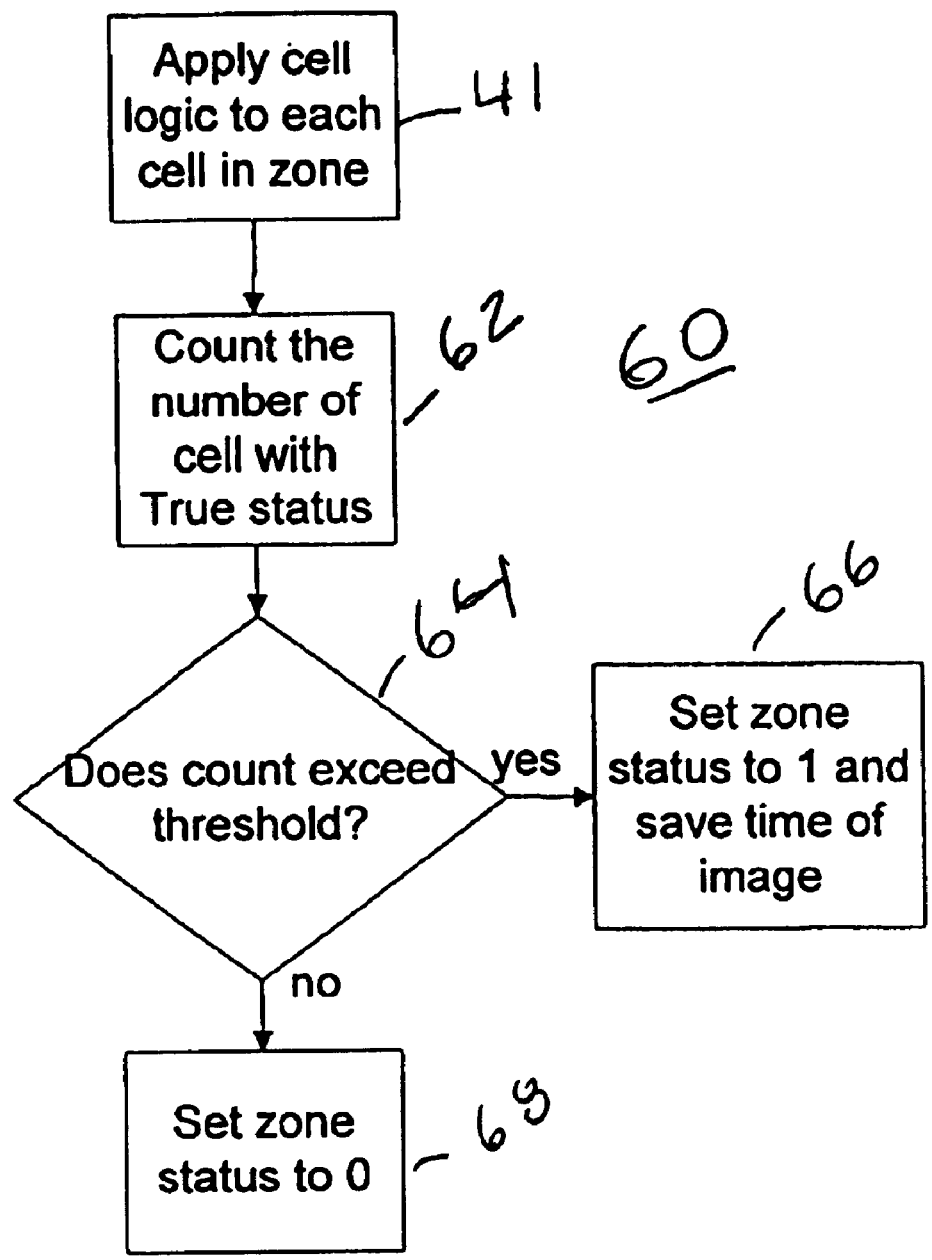
Figure 5: Zone Detection Logic

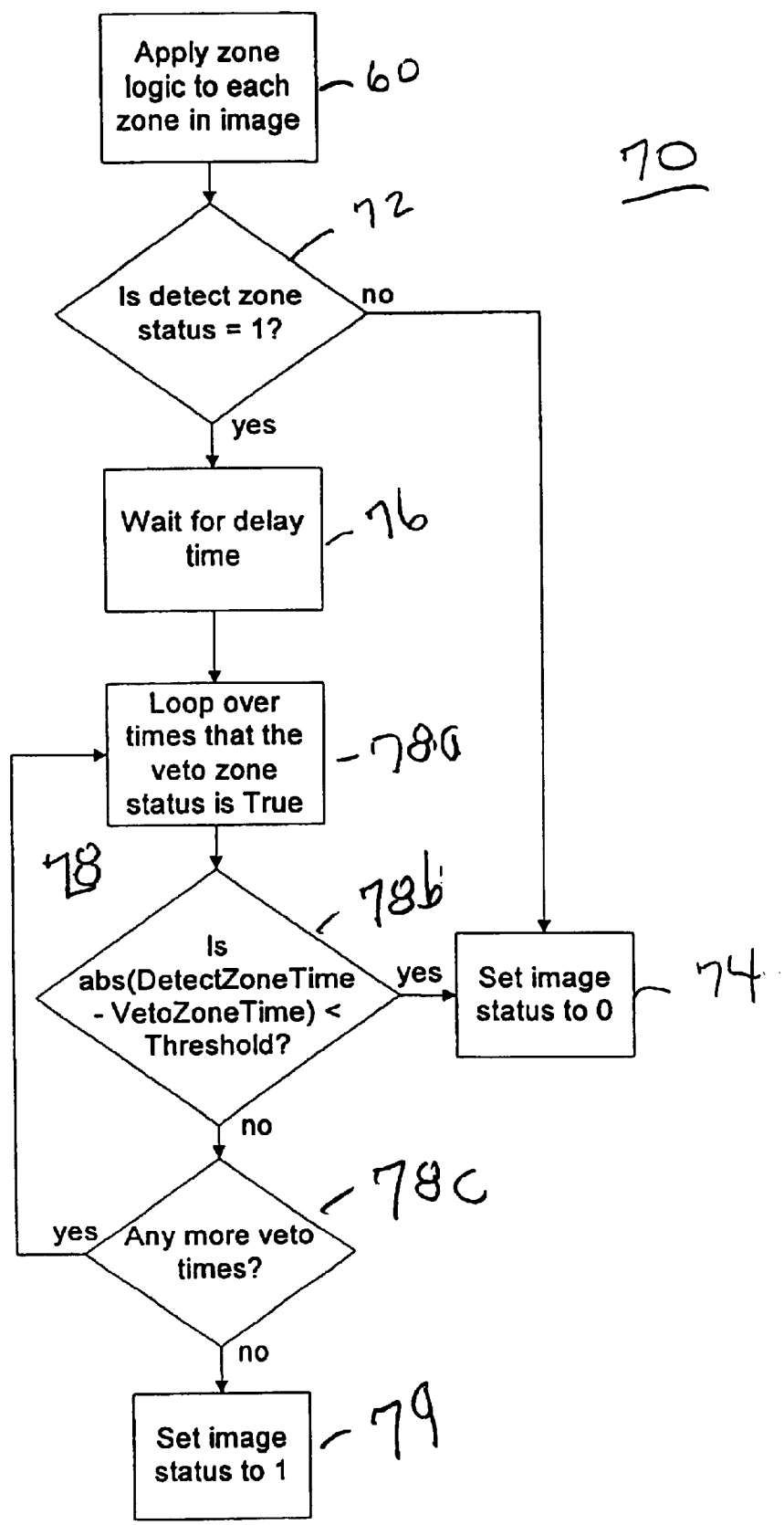
Figure 6: Image Detection Logic

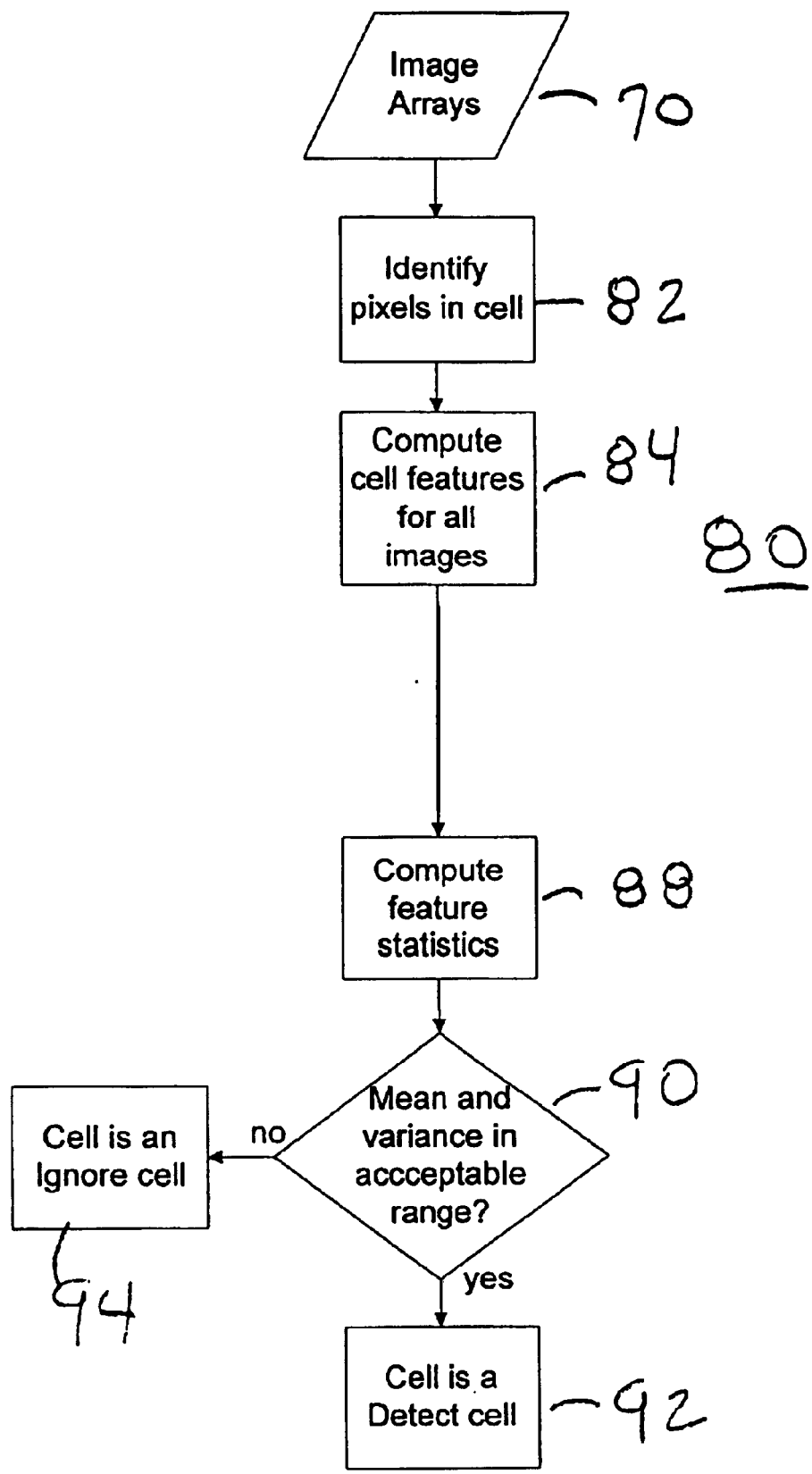
Figure 7: Logic for Setting a Cell to be an Ignore Cell

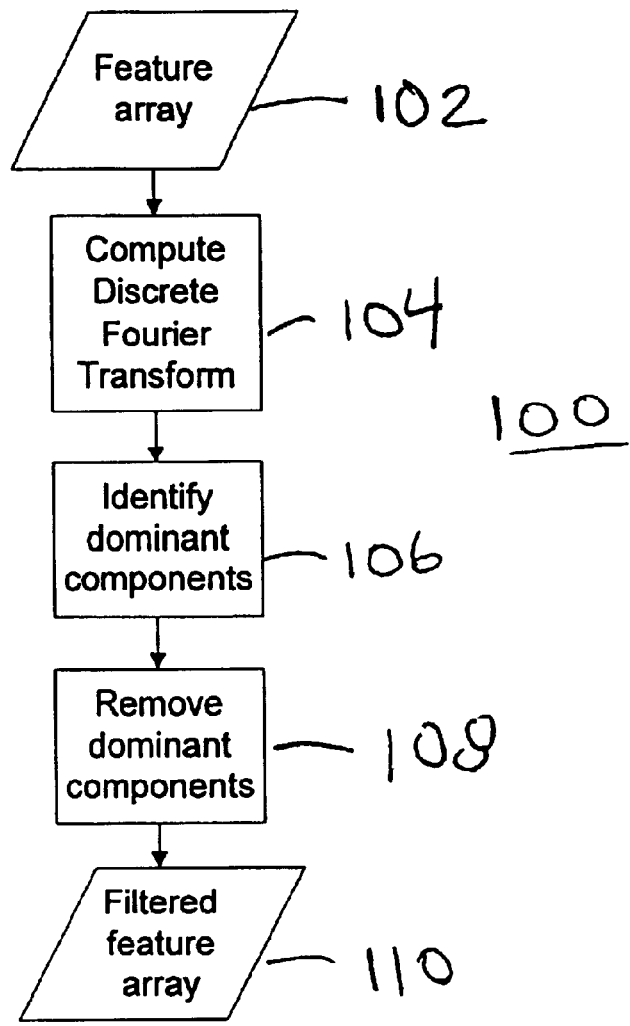
Figure 8: Algorithm for Filtering Dominant Periodic Components

IMAGE ANALYZING METHOD FOR DETECTING SIGNIFICANT CHANGES IN A TIME SEQUENCE OF IMAGES

FIELD OF THE INVENTION

This invention relates to the analysis of images and more particularly to the analysis of images in a sequence of images and in a region of interest.

DESCRIPTION OF THE PRIOR ART

There are many applications where it is desirable to analyze an image to determine if there has been a change to that image. Examples of such applications are surveillance, industrial or manufacturing processes. One example of such a process is the making of paper.

There are systems for monitoring a paper web that use multiple cameras. For example in the Smart Advisor system sold by ABB Automation Inc. a papermaking machine may have cameras stationed at various locations along the paper web. If the paper web should break, the papermaking machine operator can look at the sequence of images captured by each of the cameras for the time period just prior to the tear in order to try to find the specific image that shows the reason for the tear. The sequence of images from the cameras are synchronized with each other so that each sequence of images shows the same section of the paper web.

Using the present system the operator cannot determine if the paper web has localized defects such as holes, discoloration, edge flips and changes in takeoff angle unless these defects cause the web to tear. The detection of localized defects when they occur will increase the quality of the paper produced by the papermaking machine. Thus it is desirable to make the detection of the cause of tears in the paper automatic and also to automatically detect upon occurrence localized defects that do not give rise to tears in the web.

There are cameras such as the Panasonic WV-CL830/WV-CL834 color CCTV camera, which are typically used in surveillance systems, that have the ability to set up a grid that is divided into cells. The camera has the capability to monitor the cells to see if there has been a change to the viewed image, for example, the brightness has changed, and if so send an alarm signal to the surveillance system. Upon receipt of the alarm signal an individual must view the scene to determine why the image changed and if that change is significant.

U.S. Pat. No. 5,245,424 describes a defect defection method. In the method described therein, a video camera picks up an image of a light irradiated object. Two inspection zones adjacent each other are established on the picture screen. The zones each have a preset size and the brightness of each of the two zones is sensed and accumulated as the inspection zones are indexed across the screen. When the difference between the accumulated values of the respective inspection zones exceeds a preset threshold a defect is detected.

While the image analysis techniques of the prior art do allow a change in an image to be detected they do not include a user designated zone which will not have interesting changes therein but can be used to assess the image quality. Further none of the prior art techniques provide for the automatic assignment of cells into a zone which may include interesting changes and a zone of the image that does not have to be analyzed. Still further none of the prior art image analysis techniques allow for the analysis of the image cells to be carried out on compressed data. Yet still further none of the prior art image analysis techniques remove normal periodic variations from the image prior to computation of the feature statistics. The image analysis technique of the present invention has these properties.

SUMMARY OF THE INVENTION

A method for analyzing a time sequence of images. The method:

divides a reference image based on its visual content into:

(a) first spatially fixed areas of each image in the time sequence of images to analyze for detection by selecting in the reference image one or more detection cells collectively comprising a detection zone in which a statistically significant change in one or more predetermined features in the time sequence of images to be analyzed is expected to occur; and (b) second spatially fixed areas of each image in the time sequence of images to veto a detection of a statistically significant change in one or more predetermined features in the time sequence of images by selecting in the reference image one or more veto cells collectively comprising a veto zone in which any detection in the veto zone of a statistically significant change in one or more predetermined features in the time sequence of images is used to disable any detection of a statistically significant change in the one or more predetermined features in the time sequence of images in the detection zone.

A method for analyzing a time sequence of images. The method:

(a) uses a reference image to position analysis cells in the each image of the time sequence of images; and (b) divides the reference image based on its visual content into one or more types of analysis cells by:

(i) defining first spatially fixed areas of each image in the time sequence of images to analyze for detection by selecting in the reference image one or more detection cells collectively comprising a detection zone in which a statistically significant change in one or more predetermined features in the time sequence of images to be analyzed is expected to occur; and (ii) defining second spatially fixed areas of each image in the time sequence of images by selecting in the reference image one or more veto cells collectively comprising a veto zone in which any detection in the veto zone of a statistically significant change in one or more predetermined features in the time sequence of images is used to disable any detection of a statistically significant change in the one or more predetermined features in the time sequence of images in the detection zone.

A method for analyzing a time sequence of images. The method:

(a) uses a reference image to position analysis cells in each image of the time sequence of images; and (b) divides the reference image based on its visual content into one or more zones, each of the zones comprising a collection of cells of the same type, the one or more zones comprising:

(i) first spatially fixed areas of each image in the sequence of images by selecting in the reference image a detection zone comprising one or more detection cells in which a statistically significant change in one or more predetermined features in the time sequence of images to be analyzed is expected to occur; and (ii) second spatially fixed areas of each image in the sequence of images by selecting in the reference image a veto zone comprising one or more veto cells in which any detection in the veto zone of a statistically significant change in one or more predetermined features in the time sequence of images is used to disable any detection of a statistically significant change in one or more predetermined features in the time sequence of images in the detection zone.

A system for analyzing a time sequence of images. The system has:

a computing device operative to:

divide a reference image based on its visual content into:

(a) first spatially fixed areas of each image in the time sequence of images to analyze-for detection by selecting in the reference image one or more detection cells collectively comprising a detection zone in which a statistically significant change in one or more predetermined features in the time sequence of images to be analyzed is expected to occur; and (b) second spatially fixed areas of each image in the time sequence of images to veto a detection of a statistically significant change in one or more predetermined features in the time sequence of images by selecting in the reference image one or more veto cells collectively comprising a veto zone in which any detection in the veto zone of a statistically significant change in one or more predetermined features in the time sequence of images is used to disable any detection of a statistically significant change in the one or more predetermined features in the time sequence of images in the detection zone.

A computer readable medium having instructions for causing a computer to execute a method for analyzing a time sequence of images, the mixture having a liquid region. The instructions are for:

dividing a reference image based on its visual content into:

(a) first spatially fixed areas of each image in the time sequence of images to analyze for detection by selecting in the reference image one or more detection cells collectively comprising a detection zone in which a statistically significant change in one or more predetermined features in the time sequence of images to be analyzed is expected to occur; and (b) second spatially fixed areas of each image in the time sequence of images to veto a detection of a statistically significant change in one or more predetermined features in the time sequence of images by selecting in the reference image one or more veto cells collectively comprising a veto zone in which any detection in the veto zone of a statistically significant change in one or more predetermined features in the time sequence of images is used to disable any detection of a statistically significant change in the one or more predetermined features in the time sequence of images in the detection zone.

DESCRIPTION OF THE DRAWING

FIG. 1 shows a block diagram of the basic hardware components required to implement the method of the present invention.

FIG. 2 is a schematic of an image prior to the cell assignments.

FIG. 3 is a schematic of an image with cell assignments.

FIG. 4 is a flowchart of the cell detection logic.

FIG. 5 is a flowchart of the zone detection logic.

FIG. 6 is a flowchart of the image detection logic.

FIG. 7 is a flowchart of the logic used for setting a cell to be an Ignore cell.

FIG. 8 is a flowchart of the algorithm for filtering dominant periodic components from the feature history.

DESCRIPTION OF THE PREFERRED EMBODIMENT(S)

Referring now to FIG. 1 there are shown the basic hardware components required to implement the present invention. A video camera 10 is used to image the scene. The video signal is digitized by digitizer 12 into a two dimensional array of pixels. Each pixel has an amplitude characterized by the amount of red, green, and blue (r, g, b) color at the pixel location. Although the following discussion uses the RGB format, it is understood that the method can easily be applied to other image characterizations such as gray scale or other color models such as YUV. In the YUV model, the Y component represents the intensity of the pixel and the U and V components represent the chromaticity.

The image is analyzed by processor 14 using the method described below and, when an image is identified, the human interface 16 or another machine interface is notified so that the image can be saved or marked and further action taken.

The identification of significant regions in the image is an important feature of the method of the present invention. Consider a schematic image such as the image 20 shown in FIG. 2 which has therein representative content 22, 24 and 26. While the representative content 22, 24 and 26 is shown in image 20 as geometric shapes it should be appreciated that the representative content can be any content, for example, a pastoral scene, a high speed packaging line or an industrial process such as the making of paper.

Referring now to FIG. 3, the image 28 is a reference image used to position analysis cells in the image as will be described in more detail below. As part of the setup procedure, the user of the method of the present invention divides a reference image based on its visual content into cells consisting of one or more Detection cells, such as cells 30, 32, 34 and 36, labeled in FIG. 3 with a "d", in which an interesting change is expected to occur in the image, zero or more Ignore cells, such as cell 38, labeled in FIG. 3 with an "i", in which nothing of interest will occur, and zero or more Veto cells, such as cell 40, labeled in FIG. 3 with a "v", in which any detection is used to disable any detection in the detection zone.

As used herein a zone is a collection of possibly connected or disconnected cells of the same type. Thus, for example, Detection cells 30, 32, 34 and 36 form the detection zone. Therefore, at the end of the setup procedure the reference image has one detection zone, one veto zone and one ignore zone and the cells in each zone may or may not be connected to each other.

Only statistically significant changes in the Detection cells can identify an image as interesting. The Ignore cells are areas, of the image that are not analyzed. Any pixel, for example pixel 37 shown in FIG. 3, which is outside of an identified cell, that is, a Detection cell or a Veto cell, is by default in an Ignore cell.

A change to the image that is not of interest may also trigger a change in a Detection cell. The Veto cells are used to identify changes to the image that are not of interest and ensure that the method of the present invention ignores those changes. Examples of changes to the image that are not of interest include a loss or degradation of the video signal. A Veto cell would generally be located in an area of the image in which no change is expected.

The Detection, Veto and Ignore cells can be of arbitrary size, shape, location, and number. As is shown in FIG. 3, an Ignore cell can be inside of a Detection cell. While not shown in FIG. 3, a Veto cell can be inside of a Detection cell or vice versa.

As was described above, one application of the method of the present invention, by way of example and not by way of limitation, may be in a papermaking machine. The reference image in that application would usually be the paper web and surrounding parts of the machine. In the setup procedure the operator of the papermaking machine would typically select all of the cells in the paper web as the detection zone and the cells off sheet as the veto zone.

FIG. 4 shows a description of the analysis performed on each Detection and Veto cell by the cell detection logic 41. The digitized image array 42 is transferred from the digitizer 12 to the analyzer 14. Let the digitized image array 42 be described by the vector $(r_{ij}, g_{ij}, b_{ij})$ where i ranges over the columns in the array and j over the rows and $r_{ij}$ represents the amount of red color, $g_{ij}$ represents the amount of green color, and $b_{ij}$ represents the amount of blue color at pixel ij.

The identification of the pixels in the cell performed by block 44 is based on all the pixels in the identified cell region. Let the notation "ij in $C_k$" denote the set of pixels ij in cell $C_k$. If a Detect or Veto cell contains an Ignore cell, then the pixels in the Ignore cell are not included in the pixels in the Detect or Veto cell.

For a cell $C_k$, consisting of N pixels, a set of features or discriminants are computed 46 based on the pixel amplitudes in the cell. Possible features can be based on the intensity of each pixel in the cell:

Pixel intensity, $$I_{ij} = \sqrt{r_{ij}^2 + g_{ij}^2 + b_{ij}^2}$$

Average cell intensity, $$\bar{I} = \frac{1}{N} \sum_{i,j \text{ in } C_k} I_{ij}$$

Intensity variance, $$V_i = \frac{1}{N} \sum_{i,j \text{ in } C_k} (I_{ij} - \bar{I})^2$$

Other features can be based on the colors in the cell.

Average color, $$\vec{c} = \frac{1}{N} \left( \sum_{ij \text{ in } C_k} r_{ij}, \sum_{ij \text{ in } C_k} g_{ij}, \sum_{ij \text{ in } C_k} b_{ij} \right)$$

The method requires a training period so that the feature statistics can converge to reliable values and a decision block 48 determines if the training is completed. During the training period no cell alarm logic is applied and only the feature statistics are updated in block 50. The training period consists of a sequence of M images $I_n$ with the cell feature computation applied to each cell of each image. The user of the method of the present invention defines either the time duration of the training period or the number of images, us that is, M.

Let $f_{nmkl}$ be the value of feature l for cell k of zone m in image n with m=Detect or Veto. For convenience of notation, the zone, cell, and feature subscripts will be dropped in the discussion below and only the image index is retained. During the training period the mean and variance of each feature is computed.

Feature mean, $$\bar{f} = \frac{1}{M} \sum_{m=1,M} f_m$$

Feature variance, $$V = \frac{1}{N} \sum_{m=1,M} (f_m - \bar{f})^2$$

Once the training period is complete, the feature statistics continue to be maintained so that the method can adapt to slow changes in the statistics. For each image, zone, cell, and feature a running mean and variance is maintained.

History feature mean, $$\tilde{f}_{nmkl} = \frac{1}{M} \sum_{i=n-M+1,n} f_{inkl}$$

History feature variance, $$\tilde{V}_{nmkl} = \frac{1}{M} \sum_{i=n-M+1,n} (f_{inkl} - \tilde{f}_{nmkl})^2$$

In addition to the linear statistical average described above, other averaging techniques such as an exponential average could be employed for computing the historical feature means and variances.

As each image is analyzed once the training period is over, the feature values are compared in decision block 52 to the statistical values and the sensitivity value $\alpha_{kl}$ for cell k and feature l. If for any feature l in cell k of zone m in image n, $$(f_{nmkl} - \tilde{f}_{n-1,m,k,l}) > \alpha_{kl} \sqrt{\tilde{V}_{n-1,m,k,l}}$$

then cell status $S_{nmkl}=1$, otherwise it is 0. If the cell status is 0, then the feature statistics are updated in block 50 as described above. The cell status is set to 1 or 0 in blocks 54 and 56, respectively. A cell status of 1 is a preliminary indication of the detection of a statistically significant change in that cell.

Once the cell logic has been applied to every cell $C_k$ in zone m (m=Detect or Veto), the zone detection logic 60 of FIG. 5 is applied to those cells. The number of cells with a true status, that is, a cell of status of 1, is determined in block 62. If decision block 64 determines that the count of the number of cells with a cell status of 1, $$Z_{nm} = \sum_k S_{nmk},$$

is greater than threshold pm then block 66 sets the zone status $T_{nm}=1$, otherwise block 68 sets the zone status to 0. If the zone status is 1, then the image capture time, $t_{nm}$, is recorded. The threshold $\beta_m$ is set by the user of the method of the present invention.

The alarm logic 70 for the image is shown in FIG. 6. If decision block 72 determines that the Detect zone status $T_n$, $_{Detect}=0$, then the image status $U_n$ is set to 0 in block 74 and no significant change is indicated. If block 72 determines that $T_n$, $_{Detect}=1$, then the veto time period, $\tau$, of block 76 must pass allowing the computation of the veto zone status of future images to be computed.

The image status $U_n$ is 1 (block 79) if in loop 78, for all images i with veto zone status $t_{i,Veto}=1$ (block 78a), there are no veto zone times $t_{i,veto}$ (decision block 78c) such that abs($t_{m,Detect}-t_{i,Veto}$)<$\tau$ (decision block 78b), otherwise the image status is 0. An image status of 1 indicates that a statistically significant change has occurred in the image that is not associated with any changes in the Veto Zone. This image can then be viewed from the user interface or marked for special use by another program or process.

An enhancement to the cell assignment procedure discussed above is shown in the logic 80 of FIG. 7. This technique allows the automatic assignment of cells into either Detect or Ignore zones. The method uses a training set of images of number M with each image divided into a grid pattern of cells consisting of K columns and L rows to identify the pixels in a cell. For example if the image is 640×480 pixels, and a cell grid of 20 columns and 20 rows is defined, then each cell is 32 ×24 pixels. Based on the feature statistics, each cell is classified as either a Detect cell (block 92) or an Ignore Cell (block 94). Veto cells are not assigned by this technique. Logic 80 then proceeds to block 84 which has the same function as block 46 described in connection with FIG. 4. Thus block 84 computes the features in a cell based on the pixel amplitude in the cell.

Logic 80 then proceeds to block 88 where it computes the feature statistics for each cell. The computation of the feature statistics for each cell is performed in the same manner as described above in connection with the training period of FIG. 4.

History feature mean, $$\tilde{f}_{kl} = \frac{1}{M} \sum_{i=1,M} f_{ikl},$$

where $f_{ikl}$ is the feature l value cell k in image i

History feature variance, $$\tilde{V}_{kl} = \frac{1}{M} \sum_{i=1,M} (f_{ikl} - \tilde{f}_{kl})^2$$

Thresholding logic in the form of decision block 90 is then applied to the mean and variance to determine the cell type. Let $\alpha_l$ and $\alpha_h$ the low and high threshold limits for the mean and $\beta_l$ and $\beta_h$ the low and high threshold limits for the variance. The threshold limits are set by the user of the method of the present invention.

Block 90 determines that a cell is an Ignore cell if $$f_{kl}<\alpha_l \text{ or } f_{kl}>\alpha_l \text{ or } \tilde{V}_{kl}<\beta_l \text{ or } \tilde{V}_{kl}>\beta_l,$$

otherwise the cell is a Detect cell. If the feature is the intensity in the cell, then the cell is an Ignore cell if it is too dark or too bright, or if the variance is too small or too large. The logic 80 is appropriate in cases where the method is tuned to detect activity in areas that are generally inactive.

An additional variation on the technique can be utilized when a compression algorithm is applied to the image prior to analysis. In many cases the video signal is both digitized and compressed by special hardware. The discussion above of the analysis method of FIG. 7 assumes that the image array is uncompressed. A total decompression of the image is very time consuming and can limit the real-time rate of the analysis method. However, some cell features can be computed with only a partial decompression. Many compression algorithms such as the MJPEG and MPEG standards process the image by applying the Discrete Cosine Transform (DCT) to blocks of pixels. If the cell positions discussed above are constrained to correspond to the boundaries of the DCT blocks, then the feature computation can be optimized.

As an example, consider the MJPEG compression algorithm. Although it is beyond the scope of the description of the present invention to provide a detailed description of the algorithm, a brief overview is given herein. The MJPEG compression algorithm first converts the image from the RGB model to the YUV model. As described above, the Y component represents the intensity of the pixel and the U and V represent the chromaticity. The image pixels for each component are then divided into 8×8 blocks and the Discrete Cosine Transform is applied to each block. The resulting block DCT coefficients are quantized and then run length encoding and Huffman encoding are applied to the coefficients.

In the case where the feature is the intensity of the cell and the cell is composed of a number of DCT blocks, the average intensity of the cell can be computed by decompressing only the DC term of the included DCT blocks and averaging these values. This represents a significant savings in the feature computation time for the cell.

The described MJPEG compression analysis algorithm is designed to identify images with feature values in a selected region of the image with statistically significant deviation from the norm. Many scenes have a normal periodic variation that may generate a cyclical variation in the feature statistics. The sensitivity of the technique can be improved if the periodic variation is removed prior to computation of the feature statistics. This removal of the periodic variation is accomplished by the logic 100 of FIG. 8.

As described above, the feature statistics are computed in block 102 from a sequence of M feature values. Let $f_{nmkl}$ be the feature l value of cell k in zone m of image n where n spans the M images. To simplify the notation below, only the n index will be retained. A frequency analysis can be applied to this sequence to identify and remove any dominant periodic variation. The discrete Fourier transform of the sequence of features, computed in block 104, is given by:

$$F(w) = \sum_{n=0,M-1} f_n W_M^{wn}, \text{ where } W_M = e^{-i(2\pi/M)}$$

The fractional amplitude of any particular frequency component is:

$$r(w) = \sqrt{F(w)^*F(w)} \bigg/ \sqrt{\sum_{i=-,M-1} F(i)^*F(i)}$$

In block 106 all components that have a fractional amplitude exceeding a predetermined threshold $\gamma$ are identified and let the set S be the set of indices satisfying this criterion.

$$S=\text{set of } w \text{ such that } r(w)>\gamma$$

The components in S are then removed by block 108 from the feature sequence by applying the inverse transform resulting in a filtered feature sequence, $\hat{f}_{nmkl}$.

$$\hat{f}_{nmkl} = f_{nmkl} - \frac{1}{M} \sum_{w \text{ in } S} F(w) W_M^{-wn}$$

The features statistics and thresholding are replaced in block 110 with those based on the filtered feature values.

History feature mean, $$\tilde{f}_{nmkl} = \frac{1}{M} \sum_{i=n-M+1,n} \hat{f}_{imkl}$$

History feature variance, $$\tilde{V}_{nmkl} = \frac{1}{M} \sum_{i=n-M+1,n} (\hat{f}_{imkl} - \tilde{f}_{nmkl})^2$$

If for any feature l in cell k of zone m in image n, $$(\hat{f}_{nmkl} - \tilde{f}_{n-1,m,k,l}) > \alpha_{kl} \sqrt{\tilde{V}_{n-1,m,k,l}}$$

then cell status $S_{nmk}=1$, otherwise it is 0.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for analyzing a time sequence of images comprising:
    dividing a reference image based on its visual content into:
    (a) first spatially fixed areas of each image in said time sequence of images to analyze for detection by selecting in said reference image one or more detection cells collectively comprising a detection zone in which a statistically significant change in one or more predetermined features in said time sequence of images to be analyzed is expected to occur; and
    (b) second spatially fixed areas of each image in said time sequence of images to veto a detection of a statistically significant change in one or more predetermined features in said time sequence of images by selecting in said reference image one or more veto cells collectively comprising a veto zone in which any detection in said veto zone of a statistically significant change in one or more predetermined features in said time sequence of images is used to disable any detection of a statistically significant change in said one or more predetermined features in said time sequence of images in said detection zone.

2. The method of claim 1 further comprising dividing said reference image based on its visual content into third spatially fixed areas of each image in said time sequence of images of zero or more cells that collectively comprise an ignore zone in which no analysis of said time sequence of images is performed.

3. The method of claim 2 wherein each of said zero or more cells in said ignore zone can be inside or outside one of said one or more detection cells.

4. The method of claim 2 further comprising selecting at least one of said one or more detection cells to be connected to at least another one of said one or more detection cells.

5. The method of claim 1 wherein each of said one or more veto cells can be inside one of said one or more detection cells or each of said one or more detection cells can be inside one of said one or more veto cells.

6. The method of claim 1 further comprising selecting at least one of said one or more detection cells to be connected to at least another one of said one or more detection cells.

7. The method of claim 1 further comprising selecting at least one of said one or more veto cells to be connected to at least another one of said one or more veto cells.

8. The method of claim 1 comprising selecting said one or more veto cells in an area of said reference image in which no change is expected in said sequence of images to be analyzed.

9. The method of claim 1 further comprising computing for each image in said time sequence of images one or more features in said detection zone and said veto zone.

10. The method of claim 9 further comprising calculating for each image in said time sequence of images a value for each of one or more computed features.

11. The method of claim 10 further comprising comparing said values calculated for said one or more computed features for each of said one or more detection cells with a predetermined criteria for each of said one of more features and identifying each of said one or more detection cells in which said calculated value exceeds said predetermined criteria for each of said one or more computed features.

12. The method of claim 11 further comprising determining the total number of said identified one or more detection cells, and responsive to said total number exceeding a predetermined threshold, setting a status of said detection zone to a first predetermined status.

13. The method of claim 12 further comprising responsive to said determined total number of said identified one or more detection cells not exceeding said predetermined threshold, setting said detection zone status to a second predetermined status.

14. The method of claim 13 further comprising responsive to said detection zone status having said second predetermined status, setting an image status to a first predetermined status.

15. The method of claim 10 further comprising comparing said calculated value for each of said one or more computed features of a current image in said time sequence of images to said calculated value for an associated one of said one or more computed features calculated in all of said images in said sequence of images occurring prior to said current image.

16. The method of claim 15 wherein said calculated value is a mean or standard deviation or a combination thereof.

17. The method of claim 10 wherein said value calculated for said one or more computed features for said detection zone are calculated for each of said one or more detection cells in said detection zone.

18. A method for analyzing a time sequence of images comprising:
    (a) using a reference image to position analysis cells in said each image of said time sequence of images; and
    (b) dividing said reference image based on its visual content into one or more types of analysis cells comprising:
        (i) defining first spatially fixed areas of each image in said time sequence of images to analyze for detection by selecting in said reference image one or more detection cells collectively comprising a detection zone in which a statistically significant change in one or more predetermined features in said time sequence of images to be analyzed is expected to occur; and (ii) defining second spatially fixed areas of each image in said time sequence of images by selecting in said reference image one or more veto cells collectively comprising a veto zone in which any detection in said veto zone of a statistically significant change in one or more predetermined features in said time sequence of images is used to disable any detection of a statistically significant change in said one or more predetermined features in said time sequence of images in said detection zone.

19. A method for analyzing a time sequence of images comprising:

(a) using a reference image to position analysis cells in each image of said time sequence of images; and (b) dividing said reference image based on its visual content into one or more zones, each of said zones comprising a collection of cells of the same type, said one or more zones comprising:

(i) first spatially fixed areas of each image in said sequence of images by selecting in said reference image a detection zone comprising one or more detection cells in which a statistically significant change in one or more predetermined features in said time sequence of images to be analyzed is expected to occur; and (ii) second spatially fixed areas of each image in said sequence of images by selecting in said reference image a veto zone comprising one or more veto cells in which any detection in said veto zone of a statistically significant change in one or more predetermined features in said time sequence of images is used to disable any detection of a statistically significant change in one or more predetermined features in said time sequence of images in said detection zone.

20. A system for analyzing a time sequence of images comprising:

a computing device operative to:

divide a reference image based on its visual content into:

(a) first spatially fixed areas of each image in said time sequence of images to analyze for detection by selecting in said reference image one or more detection cells collectively comprising a detection zone in which a statistically significant change in one or more predetermined features in said time sequence of images to be analyzed is expected to occur; and (b) second spatially fixed areas of each image in said time sequence of images to veto a detection of a statistically significant change in one or more predetermined features in said time sequence of images by selecting in said reference image one or more veto cells collectively comprising a veto zone in which any detection in said veto zone of a statistically significant change in one or more predetermined features in said time sequence of images is used to disable any detection of a statistically significant change in said one or more predetermined features in said time sequence of images in said detection zone.

21. The system of claim 20 further comprising an image forming device for proving said reference image and said time sequence of images.

22. The system of claim 21 further comprising a digitizer between said image forming device and said computing device.

23. A computer readable medium having instructions for causing a computer to execute a method for analyzing a time sequence of images, said mixture having a liquid region, said instructions comprising:

dividing a reference image based on its visual content into:

(a) first spatially fixed areas of each image in said time sequence of images to analyze for detection by selecting in said reference image one or more detection cells collectively comprising a detection zone in which a statistically significant change in one or more predetermined features in said time sequence of images to be analyzed is expected to occur; and (b) second spatially fixed areas of each image in said time sequence of images to veto a detection of a statistically significant change in one or more predetermined features in said time sequence of images by selecting in said reference image one or more veto cells collectively comprising a veto zone in which any detection in said veto zone of a statistically significant change in one or more predetermined features in said time sequence of images is used to disable any detection of a statistically significant change in said one or more predetermined features in said:time sequence of images in said detection zone.

* * * * *